UNITED STATES PATENT OFFICE.

ABRAHAM B. COX, OF CHERRY VALLEY, NEW YORK, ASSIGNOR TO GENERAL REDUCTION GAS AND BY-PRODUCTS COMPANY, OF NEW YORK, N. Y., A CORPORATION OF DELAWARE.

PROCESS FOR PURIFYING POTASSIUM CHLORID.

1,252,784. Specification of Letters Patent. Patented Jan. 8, 1918.

No Drawing. Application filed April 17, 1915. Serial No. 22,029.

*To all whom it may concern:*

Be it known that I, ABRAHAM B. COX, a citizen of the United States, and a resident of Cherry Valley, Otsego county, New York, have invented a certain new and useful Improvement in Processes for Purifying Potassium Chlorid, of which the following is a specification.

In certain "alkali" lakes and other waters where potassium chlorid exists in solution with a number of other salts, it is possible to separate the salts one from the other in a state of commercial purity. When this separation has occurred, however, there still remains a small percentage of other salts mixed with the potassium chlorid, which it is the object of my invention to eliminate in order to produce an article of a high degree of purity. For instance, the potassium chlorid may contain small amounts of sodium monocarbonate ($Na_2CO_3$), borax (sodium tetra borate, $Na_2B_4O_7$—$10H_2O$), sodium sulfate ($Na_2SO_4$) and also salt (sodium chlorid, $NaCl$), which it is desirable to remove.

I have found that by adding calcium chlorid ($CaCl_2$) to a solution of potassium chlorid containing impurities mentioned above, or any other chemical reagent having similar properties, I am enabled to form insoluble compounds from the reaction of the calcium chlorid with all of the above-mentioned substances except the sodium and potassium chlorids. I mix a requisite amount of a solution of calcium chlorid with the solution of the potassium chlorid so contaminated, which results in the following reactions:

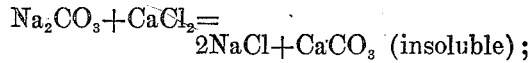
$Na_2CO_3 + CaCl_2 = 2NaCl + CaCO_3$ (insoluble);

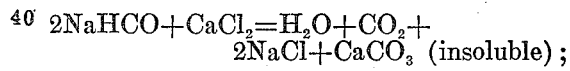
$2NaHCO_3 + CaCl_2 = H_2O + CO_2 + 2NaCl + CaCO_3$ (insoluble);

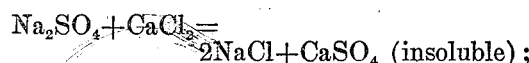
$Na_2SO_4 + CaCl_2 = 2NaCl + CaSO_4$ (insoluble);

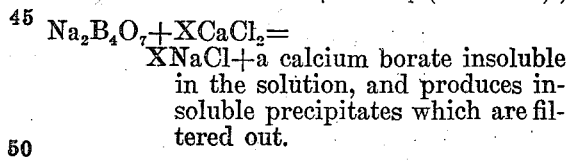
$Na_2B_4O_7 + XCaCl_2 = XNaCl +$ a calcium borate insoluble in the solution, and produces insoluble precipitates which are filtered out.

As a result of these reactions, therefore, we have in solution a mixture of potassium chlorid, sodium chlorid and calcium chlorid (if the amount of calcium chlorid added be in excess), and the precipitates are readily filtered from the solution. By reason of the great solubility of calcium chlorid and its strong affinity for water, the potassium chlorid may be readily removed from the calcium chlorid by a process of fractional crystallization, and the affinity of calcium chlorid for water is so much greater than that of either the sodium chlorid or the potassium chlorid that they may be very readily eliminated by evaporating the greater part of the liquid, the potassium chlorid and the sodium chlorid being crystallized out and the calcium chlorid remaining in solution, even when a very small part of the liquid remains unevaporated.

Practically the only impurity remaining, therefore, is the sodium chlorid, and as the amount of this is, as a rule, very small as respects the bulk of the potassium chlorid, and, generally speaking, is not objectionable, it may be allowed to remain or else may be separated by fractional crystallization, which is now a very simple matter as there is but a single impurity to remove.

Another method of recovering the potassium chlorid from the solution containing potassium chlorid, sodium chlorid and possibly calcium chlorid, is, to concentrate the solution, so that it will be saturated at a moderately high temperature, say 200° F., and then cool it to a moderately low temperature, say 40° F. In most instances the potassium chlorid would predominate to so marked an extent that it will be precipitated from a solution so concentrated practically without any admixture of sodium chlorid. The solubility of sodium chlorid is essentially the same at all temperatures, while that of potassium chlorid varies markedly with the temperature, so that, unless the sodium chlorid be very much in excess, it must, of necessity, remain in solution.

My invention is also applicable to the purification of potassium chlorid from other sources, which contains injurious salts, particularly monocarbonate, the alkalinity of which would greatly detract from the value of the potassium chlorid as a fertilizer, and it is obvious that various modifications may be made within the scope of the invention claimed.

What I claim is:

1. The method of purifying potassium chlorid, which consists in adding calcium chlorid to a solution containing potassium chlorid and salts which will react to form insoluble calcium compounds, whereby the impurities contained in the solution are precipitated, removing the precipitates, and recovering the purified potassium chlorid from the filtrate.

2. The method of purifying potassium chlorid, which consists in adding calcium chlorid to a solution containing potassium chlorid and salts which will react to form insoluble calcium compounds, whereby the impurities are thrown down in the form of insoluble matter, removing the insoluble matter, and separating the potassium chlorid in pure form from the filtrate by fractional crystallization.

3. The method of purifying potassium chlorid containing the following impurities: sodium monocarbonate, sodium bicarbonate, sodium sulfate, borax and sodium chlorid, which consists in dissolving the material and in adding a reagent to the solution capable of converting the sodium monocarbonate, the sodium bicarbonate, the sodium sulfate and borax into insoluble salts, whereby such conversion is effected, removing the insoluble matter, and recovering the potassium chlorid from the filtrate.

ABRAHAM B. COX.